(12) United States Patent
Canuto

(10) Patent No.: US 9,533,390 B2
(45) Date of Patent: Jan. 3, 2017

(54) DEVICE FOR CHANGING STRAIGHT FLUTE DRILL BITS FOR DEEP HOLE DRILLING

(71) Applicant: Almerino Canuto, Casale Sul Sile (IT)

(72) Inventor: Almerino Canuto, Casale Sul Sile (IT)

( * ) Notice: Subject to any disclaimer, the term of this patent is extended or adjusted under 35 U.S.C. 154(b) by 219 days.

(21) Appl. No.: 14/386,874

(22) PCT Filed: Jan. 30, 2013

(86) PCT No.: PCT/EP2013/051771
§ 371 (c)(1),
(2) Date: Sep. 22, 2014

(87) PCT Pub. No.: WO2013/139518
PCT Pub. Date: Sep. 26, 2013

(65) Prior Publication Data
US 2015/0057139 A1 Feb. 26, 2015

(30) Foreign Application Priority Data
Mar. 21, 2012 (IT) .............................. TV2012A0043

(51) Int. Cl.
*B23Q 3/157* (2006.01)
*B23B 41/02* (2006.01)
*B23Q 3/155* (2006.01)

(52) U.S. Cl.
CPC ........... *B23Q 3/15526* (2013.01); *B23B 41/02* (2013.01); *B23Q 3/15713* (2013.01); *Y10S 408/705* (2013.01); *Y10T 408/567* (2015.01); *Y10T 483/1736* (2015.01); *Y10T 483/1738* (2015.01); *Y10T 483/1788* (2015.01); *Y10T 483/1864* (2015.01)

(58) Field of Classification Search
CPC ..................... Y10T 483/1736; Y10T 483/1788; Y10T 483/1864; Y10S 408/705; B23B 41/02
USPC .................................. 483/31, 53, 65; 408/705
See application file for complete search history.

(56) References Cited

U.S. PATENT DOCUMENTS 2,708,852 A * 5/1955 Wohlfahrt ........... B23B 51/0486
408/110
6,228,007 B1 * 5/2001 Quak ...................... B23B 41/12
408/51

(Continued)

FOREIGN PATENT DOCUMENTS

DE 102005043399 A1 3/2007
EP 0141153 A1 9/1984

(Continued)

OTHER PUBLICATIONS

Machine Translation of JP 2995305-B2, which JP '305 was published Dec. 1999.*

(Continued)

*Primary Examiner* — Erica E Cadugan
(74) *Attorney, Agent, or Firm* — Cantor Colburn LLP

(57) ABSTRACT

A device for changing straight flute drill bits for deep hole drilling, comprising a magazine, for moving a plurality of single drill bit supporting sliders, which is provided with a movable arm for the loading/unloading of one of the sliders from the magazine. The arm moreover enables the positioning of one of the sliders at a head of an adjacent multifunctional machine, the head having coupling/release elements for one of the sliders.

8 Claims, 12 Drawing Sheets

(56) References Cited

U.S. PATENT DOCUMENTS

| | | | | |
|---|---|---|---|---|
| 6,287,245 B1 * | 9/2001 | Randecker | ............... | B23B 41/02 |
| | | | | 29/26 A |
| 7,581,473 B2 * | 9/2009 | Tanaka | .................... | B23B 41/02 |
| | | | | 279/2.02 |
| 2010/0323863 A1 * | 12/2010 | Ogasawara | ........ | B23Q 3/15526 |
| | | | | 483/58 |

FOREIGN PATENT DOCUMENTS

| JP | 62-004504 A | * | 1/1987 |
| JP | 62-264813 A | * | 11/1987 |
| JP | 04-365532 A | * | 12/1992 |
| JP | 06-079568 A | * | 3/1994 |
| JP | 09-057564 A | * | 3/1997 |
| JP | 2995305 B2 | * | 12/1999 |
| KR | 101291210 B1 | * | 7/2013 |

OTHER PUBLICATIONS

International Search Report for corresponding application PCT/EP2013/051771 filed Jan. 30, 2013; Mail date Mar. 1, 2013.
Written Opinion for corresponding application PCT/EP2013/051771 filed Jan. 30, 2013; Mail date Mar. 1, 2013.

\* cited by examiner

Head 18 is Tiltable About a Rotation Axis in a Controlled Fashion, and Lockable by a Positioning Brake

FIG. 12

DEVICE FOR CHANGING STRAIGHT FLUTE DRILL BITS FOR DEEP HOLE DRILLING

The present application relates to a device for changing straight flute drill bits for deep hole drilling.

Nowadays, the term 'deep hole drilling' is used when the length of the hole exceeds the diameter of the drill tool by a factor of ten.

Such deep hole drilling can be done in two different ways: with "straight flute drill bits" or with "BTA/STS" drill tools.

Deep hole drilling is used in molds for plastic, die casting, thermoforming, blowing, aeronautic parts, hydraulic parts, mechanical transmissions, parts for the medical sector, and the like.

Lightening, cooling, and optimizing the thermal and deformation gradients in these pieces are all achieved increasingly frequently with deep-drilled holes.

Nowadays dedicated machines are known on the market which are exclusively for deep hole drilling and which use a mechanical structure complete with drill bit guide accessories and automatic attachments for fixing to a slider-supporting bracket and they have a system for drainage of drilling liquids and residues.

Presently, changing the drill bit is done directly on the spindle axle of the drilling machine by way of a purely manual installation.

Installation of the drill bit thus involves the manual substitution of drill bit guide accessories depending on the type of working to be carried out.

This operation is thus achieved with great expenditure of time and directly inside the machine tool space. This moreover comprises a machine shutdown and the presence of an operator for changing between the various working steps.

The main aim of the present invention is thus to solve the above mentioned technical problems, eliminating the drawbacks in the cited known art and thus providing an invention that makes it possible to install a drill bit in a machine head for deep hole drilling in a machining center, automatically and without the attendance of an operator.

Within this aim, an object of the invention is to provide a device that allows also to execute a rapid drill bit change on milling machines without the attendance of an operator.

Another object of the invention is to provide a device that enables a change of drill bits, automatically and without an operator, thus enabling a 24-hour use of the machine even under conditions in which it is not attended by an operator.

Another object is to provide a device that makes it possible to prevent long machine shutdown times for changing the drill bit in the machine.

Another object is to provide a device that is structurally simple, low cost and can be provided with the usual conventional systems.

This aim and these and other objects which will become better apparent hereinafter are achieved by a device for changing straight flute drill bits for deep hole drilling, characterized in that it comprises a magazine, for moving a plurality of single drill bit supporting sliders, which is provided with a movable arm for the loading/unloading of one of said sliders from said magazine and for the positioning of one of said sliders at a head of an adjacent multifunctional machine, said head having coupling/release means for one of said sliders.

Further characteristics and advantages of the invention will become better apparent from the detailed description of a specific, but not exclusive, embodiment, illustrated by way of non-limiting example in the accompanying drawings, wherein.

Figure 1:
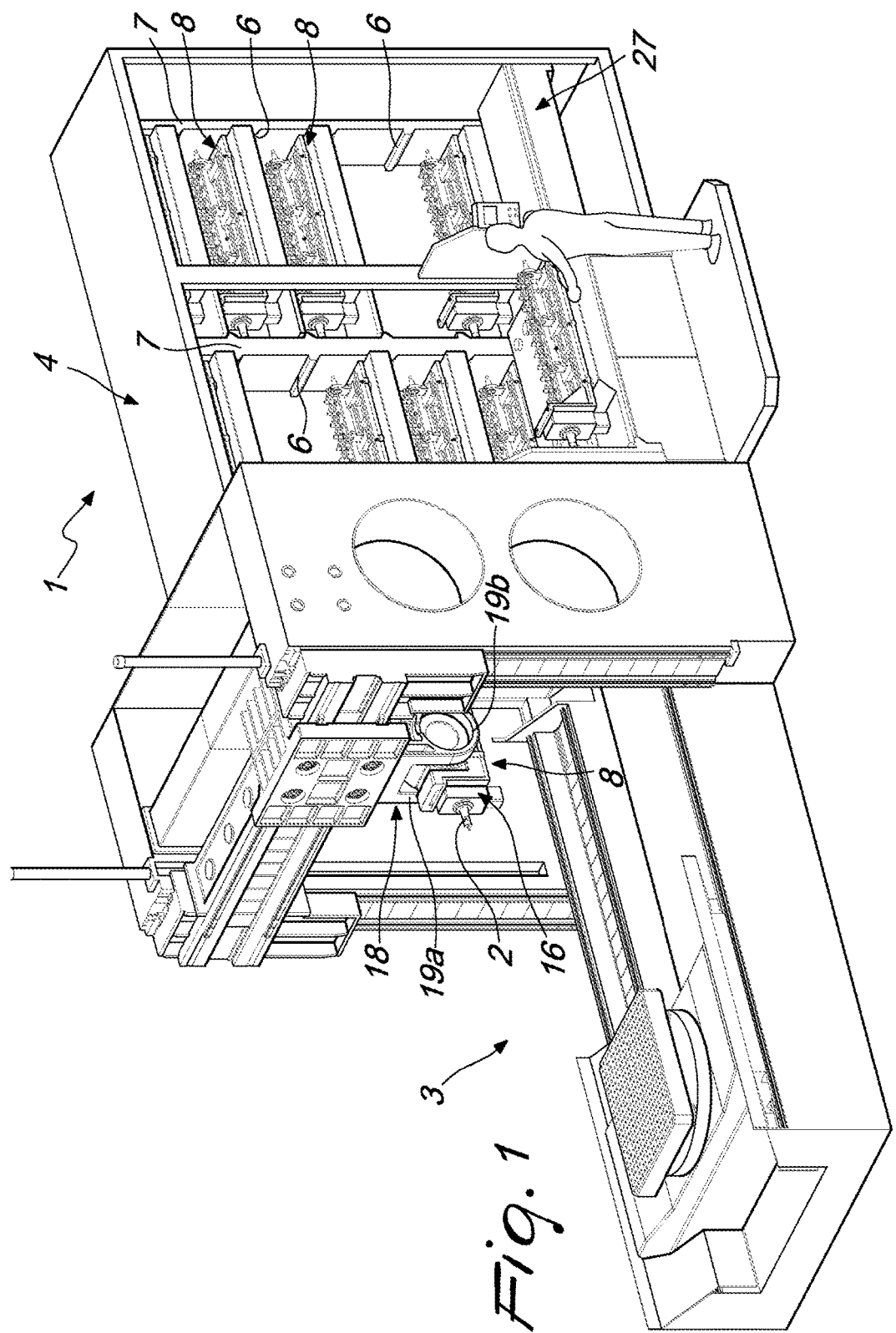
FIG. 1 is a three-quarters side view of a device according to the invention paired with a milling machine.
Figure 2:
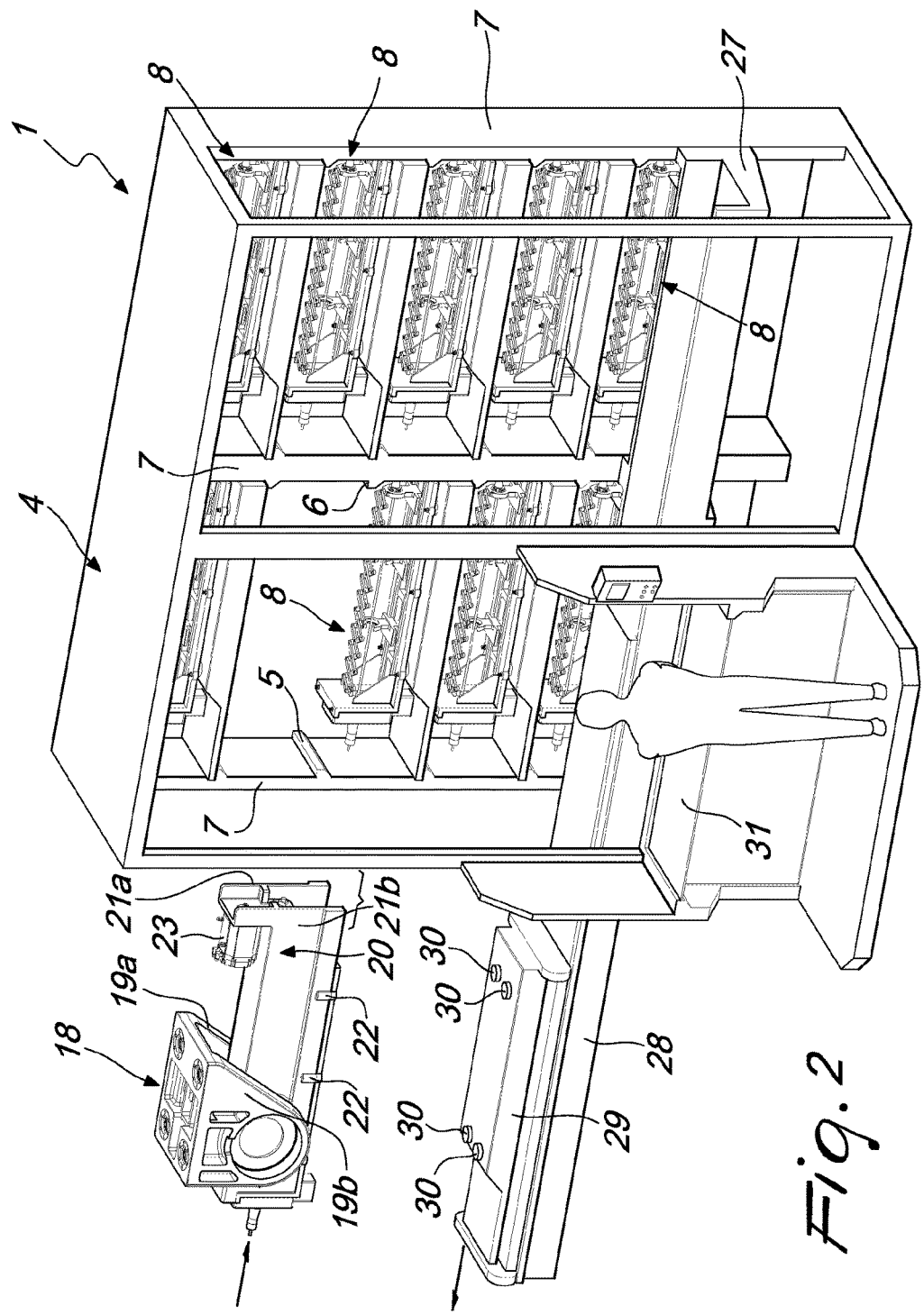
FIG. 2 is a three-quarters side view of the device in the initial step of unloading a slider.

FIG. 12 schematically depicts a feature of the invention.

In the embodiments that follow, individual characteristics shown in relation to specific examples may in reality be interchanged with other, different characteristics, existing in other embodiments.

Moreover, it should be noted that anything found to be already known during the patenting process is understood not to be claimed and to be the subject of a disclaimer.

With reference to the figures, the reference numeral 1 generally designates a device for changing straight flute drill bits 2 for deep hole drilling, for use in multifunctional machines 3, such as for example milling machines.

The device 1 comprises a magazine 4 which is provided with a plurality of pairs of protrusions 5, 6 which protrude, on a same plane, from adapted posts 7, each pair of protrusions being adapted to support a single drill bit supporting slider 8.

Each slider 8 is constituted by a body 9 which is provided with a pair of tracks 10a, 10b for guides 11 an end one of which has a drill bit supporting cone 12.

Such end guide 11 is coupled with the end of a scissor-like device 13 which is associated, at the other end, with a protrusion 14 which protrudes from an adapted head plate 15 which has, at the opposite end, an assembly 16 for supporting the drill bit 2.

At the body 9 and at the assembly 16 there are engagement/disengagement means 17 of the slider 8 to an adapted head 18 of the milling machine.

Advantageously the head 18 is tiltable by way of a rotation axis which is controlled and locked by an adapted positioning brake, as schematically shown in FIG. 12.

The head 18 has a pair of mutually parallel first wings 19a, 19b, between which an adapted bracket 20 is pivoted which is adapted to support a single slider 8.

Such bracket 20 has an essentially inverted U-shape so as to define a pair of second wings 21a, 21b which are sized conveniently to accommodate temporarily between them a single slider 8.

Outside the pair of second wings 21a, 21b adapted locking spindles 22 are provided, which interact with the engagement/disengagement means 17.

The bracket 20 further comprises an adapted motor 23 which is adapted to move, by way of an adapted screw 24, an adapted carriage 25 which can slide on the pair of tracks 10a, 10b and supports a motorized spindle 26 which interacts with the drill bit supporting cone 12 in order to turn the drill bit.

The magazine 4 moreover comprises, preferably frontally with respect to the region provided with the plurality of projections 5, 6 for supporting the sliders 8, a support 27 for an arm 28 which can move along a plane which is parallel to the plane of arrangement of the single sliders 8 contained in the magazine 4.

The arm 28 supports, in an upper region, a tray 29 with which it is possible to associate temporarily the body 9 of a single slider 8.

Such tray 29 in fact has adapted engagement means 30.

The support 27 can move longitudinally and vertically, so as to be able to arrange selectively the arm 28 and thus the tray 29 on a plane which is adjacent to the plane of arrangement of each single slider 8.

The magazine 4 has, laterally adjacent to the arm 28 on the opposite side with respect to the region of arrangement of the single sliders 8, a shelf 31 on which a single slider 8 can be arranged temporarily.

Figure 3:
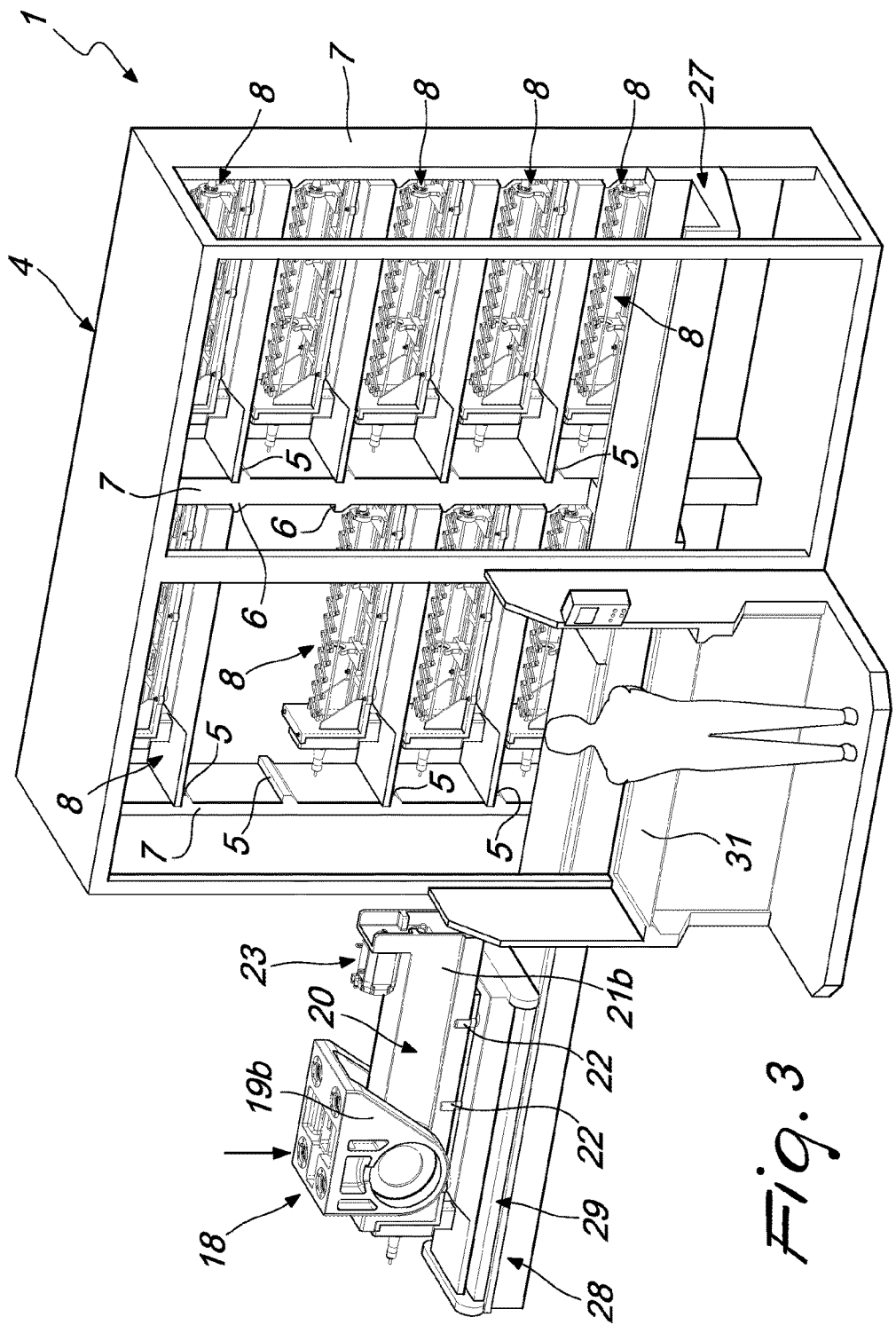
FIG. 3 is a similar view to the previous figure, of the step of lowering the head at the movable arm.

Operation of the device is the following. Beginning with the view in FIG. 3, we have the condition in which the arm 28 is positioned outside the magazine 4 with the tray 29 unloaded.

In this step, the head 18 is engaged with a slider 8; the head has been extracted from the milling machine and is positioned above the tray 29.

Figure 4:
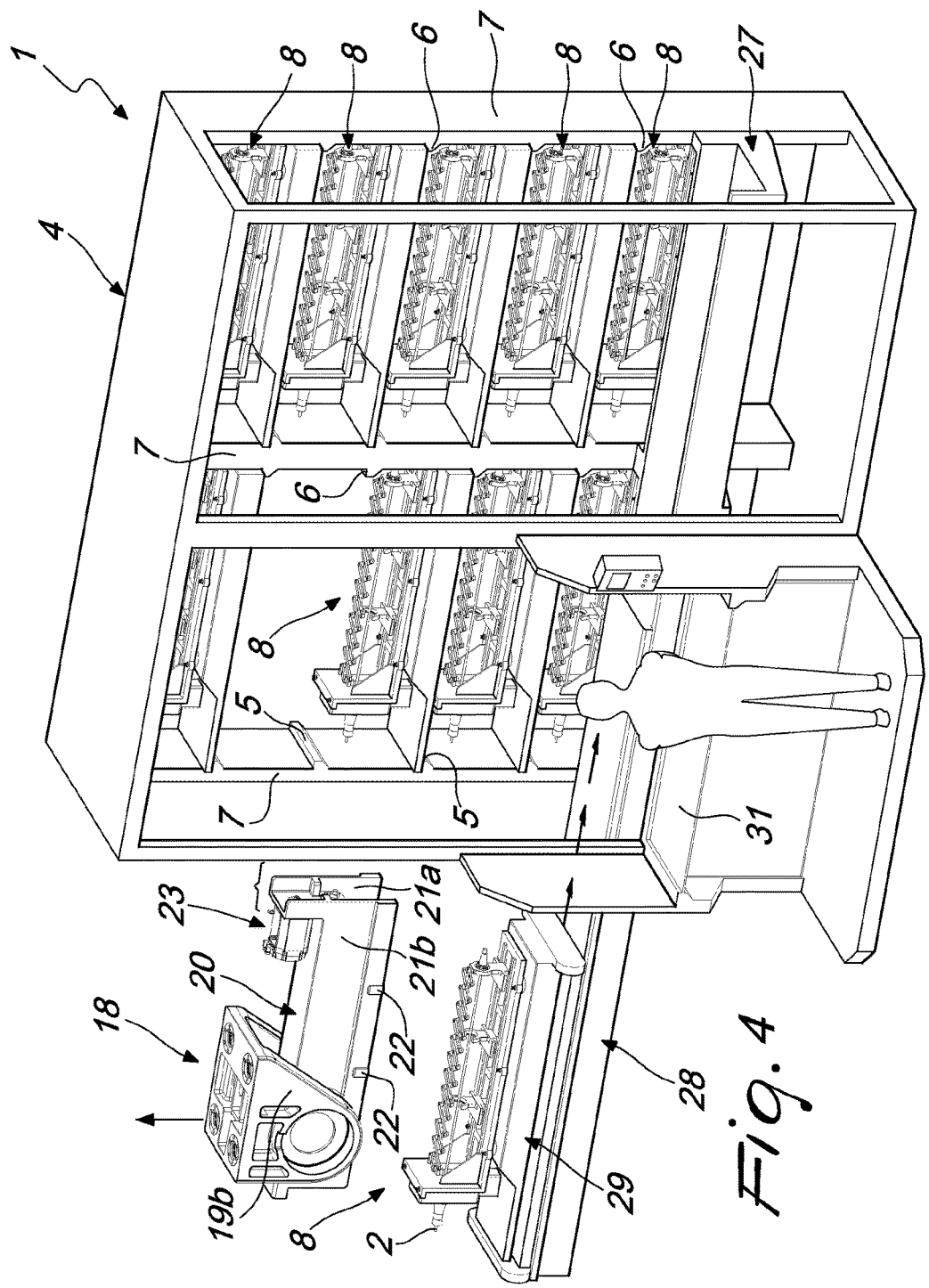
FIG. 4 is a similar view to the previous figure, of the step of uncoupling the slider from the head.

Turning now to FIG. 4, we have the condition in which the head 18 has unloaded the single slider 8 at the tray 29: the tray 29 is thus moved until, for example, it reaches a region adjacent to the shelf 31 or a region adjacent to one of the pairs of protrusions 5, 6 which does not support a slider 8.

Figure 5:
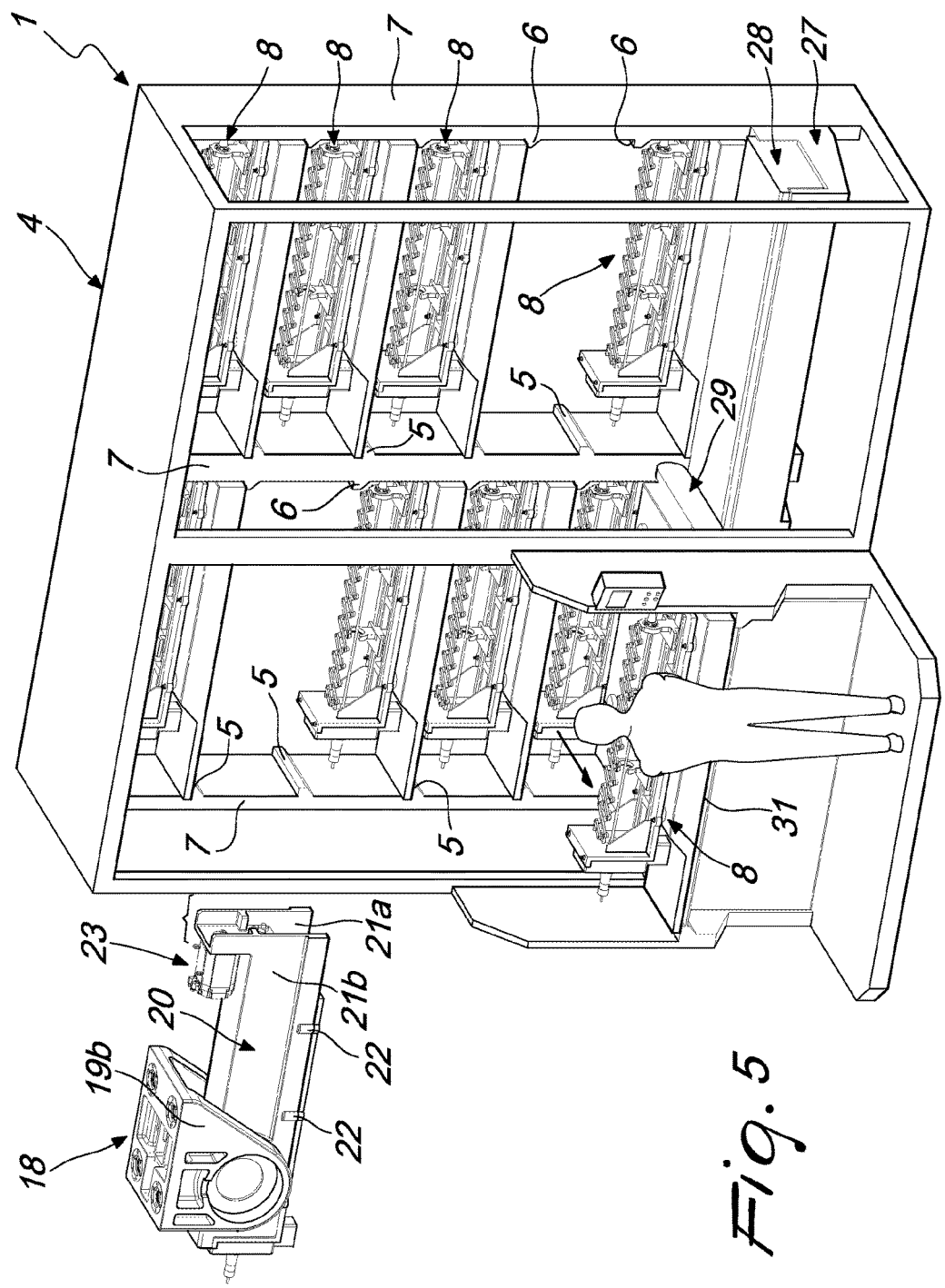
FIG. 5 is a similar view to the previous figure, of the step of lifting the head to couple a new slider.

An example of such condition is shown in FIG. 5.

Figure 6:
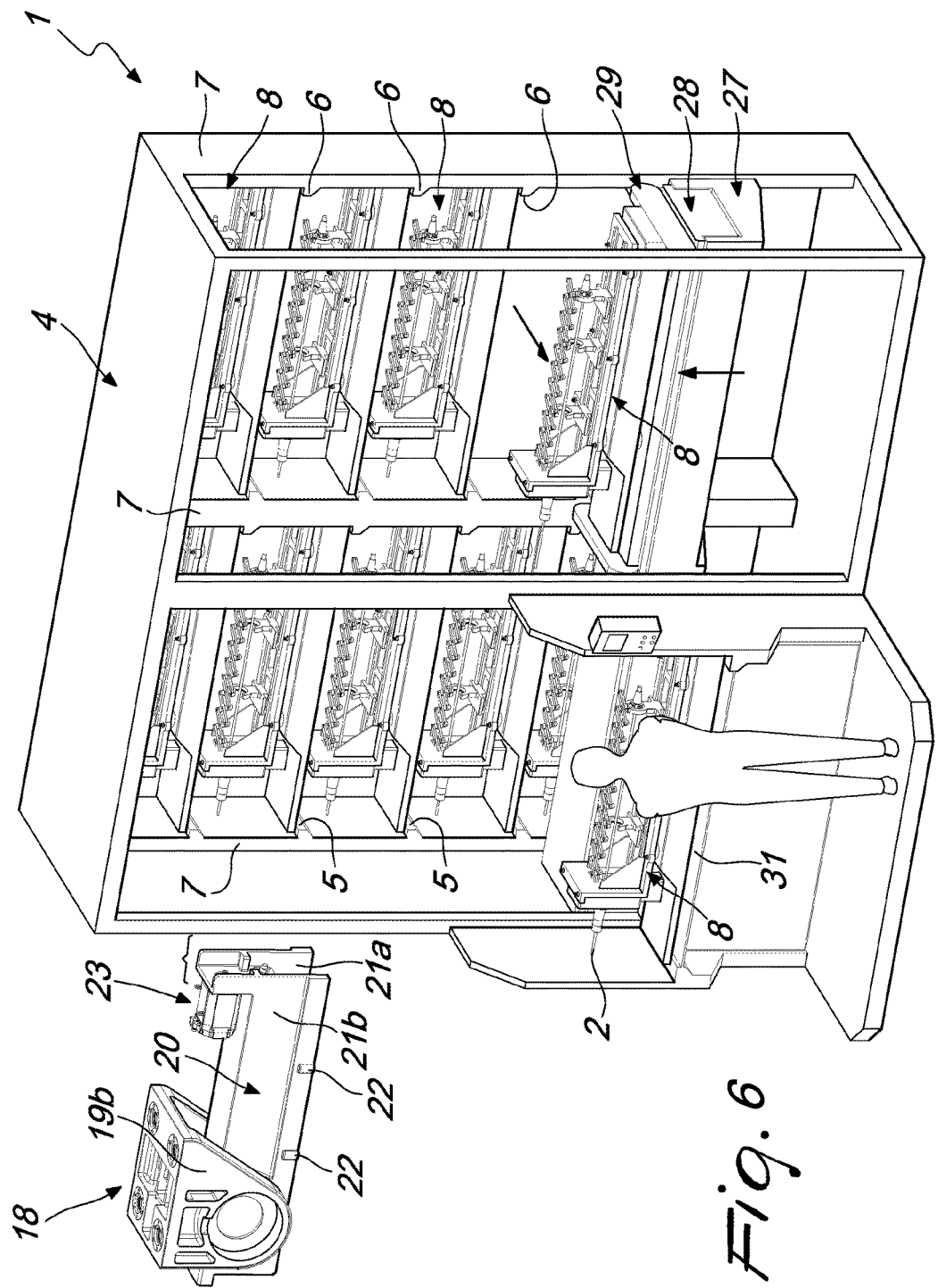
FIG. 6 is a similar view to the previous figure, of the step of retrieving a new slider.

Subsequently, as shown in FIG. 6, the tray 29 is placed at a pair of protrusions 5, 6 which supports the head 8 that is desired to be used in the milling machine; the head 8 is then arranged on the tray 29 which is then lifted until it is arranged in a region that is adjacent to the head 18.

Figure 7:
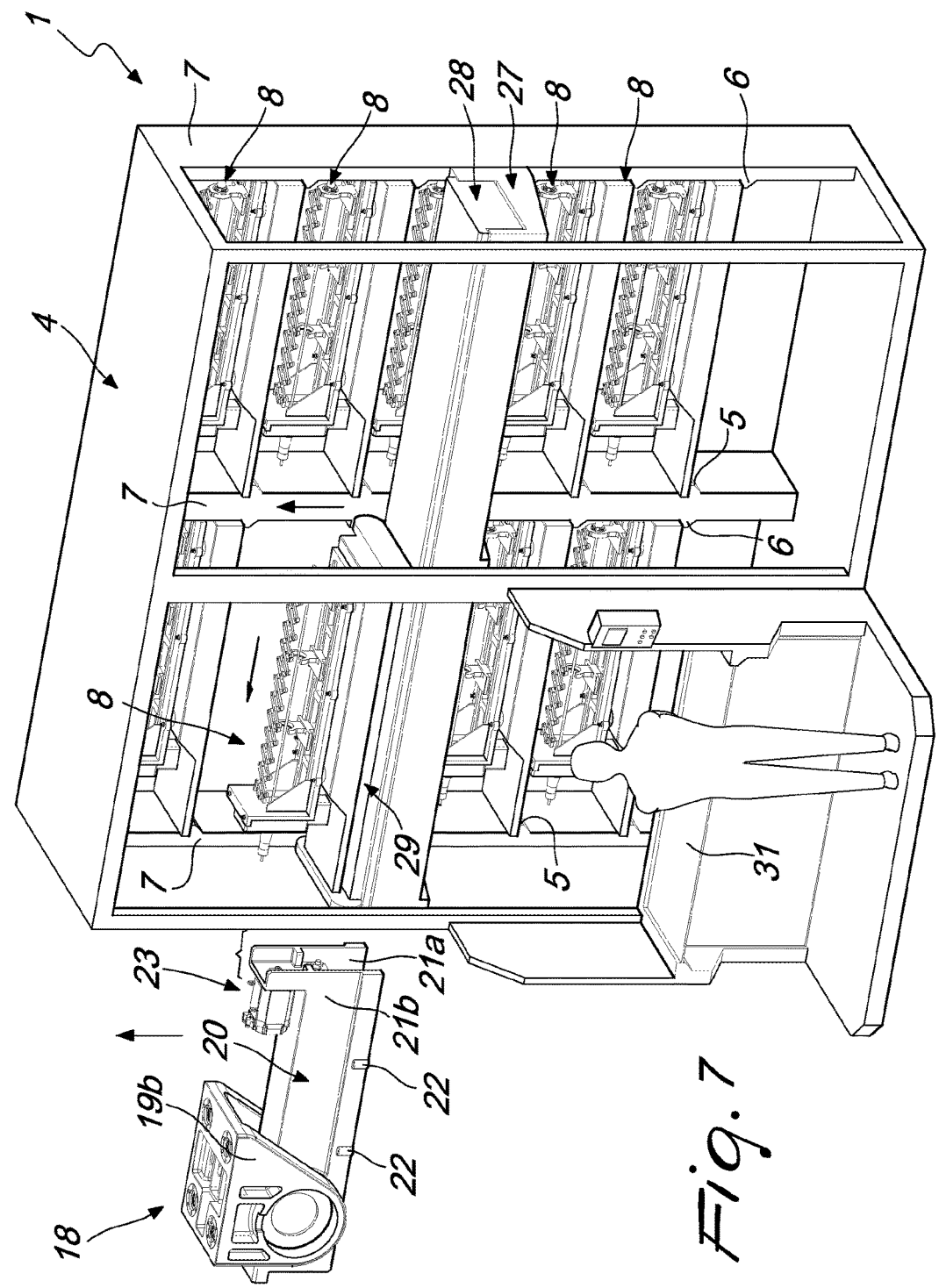
FIG. 7 is a similar view to the previous figure, of the step of lifting the arm with a new slider.
Figure 8:
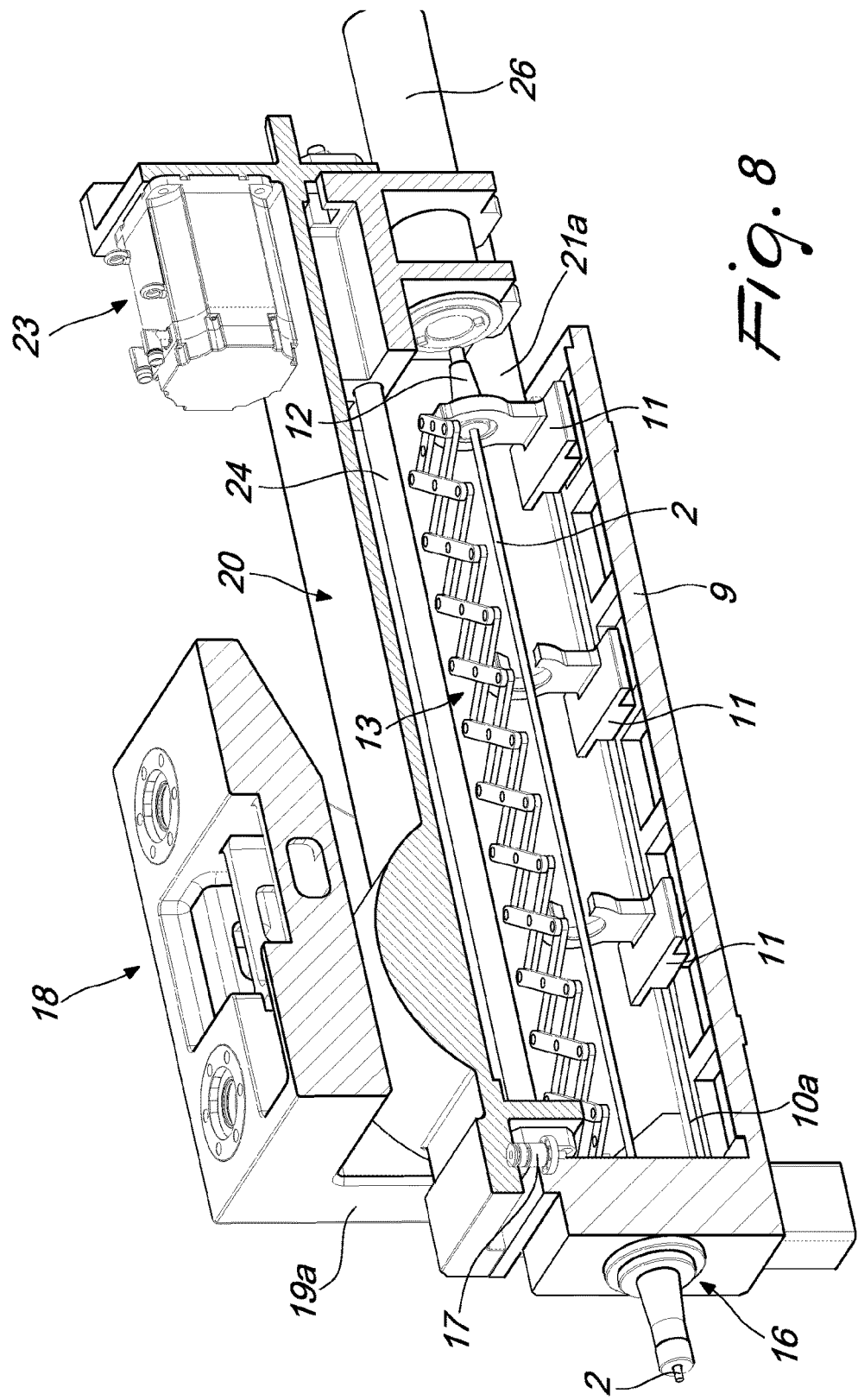
FIGS. 8, 9, 10 and 11 are various views of a slider.
Figure 9:
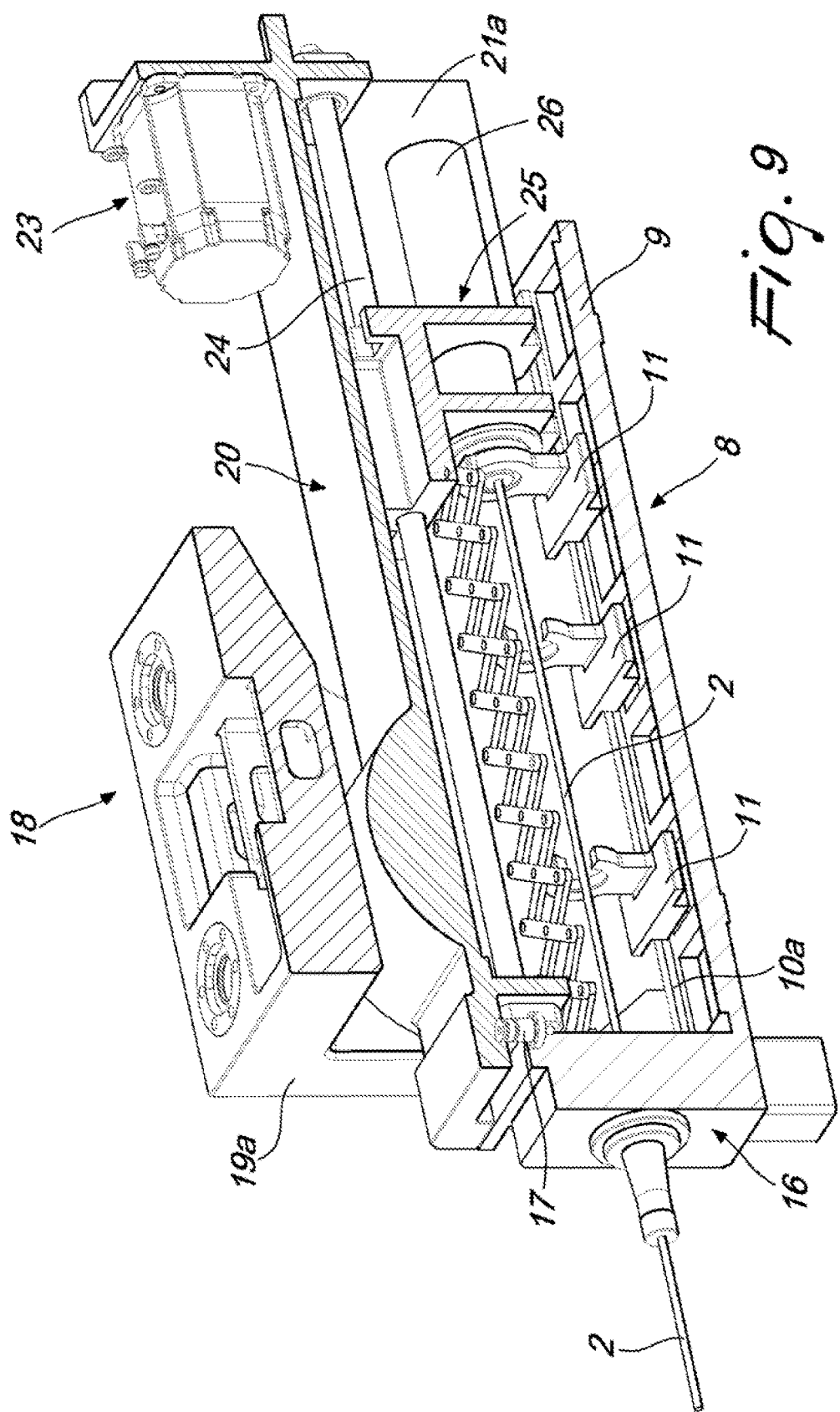
Figure 10:
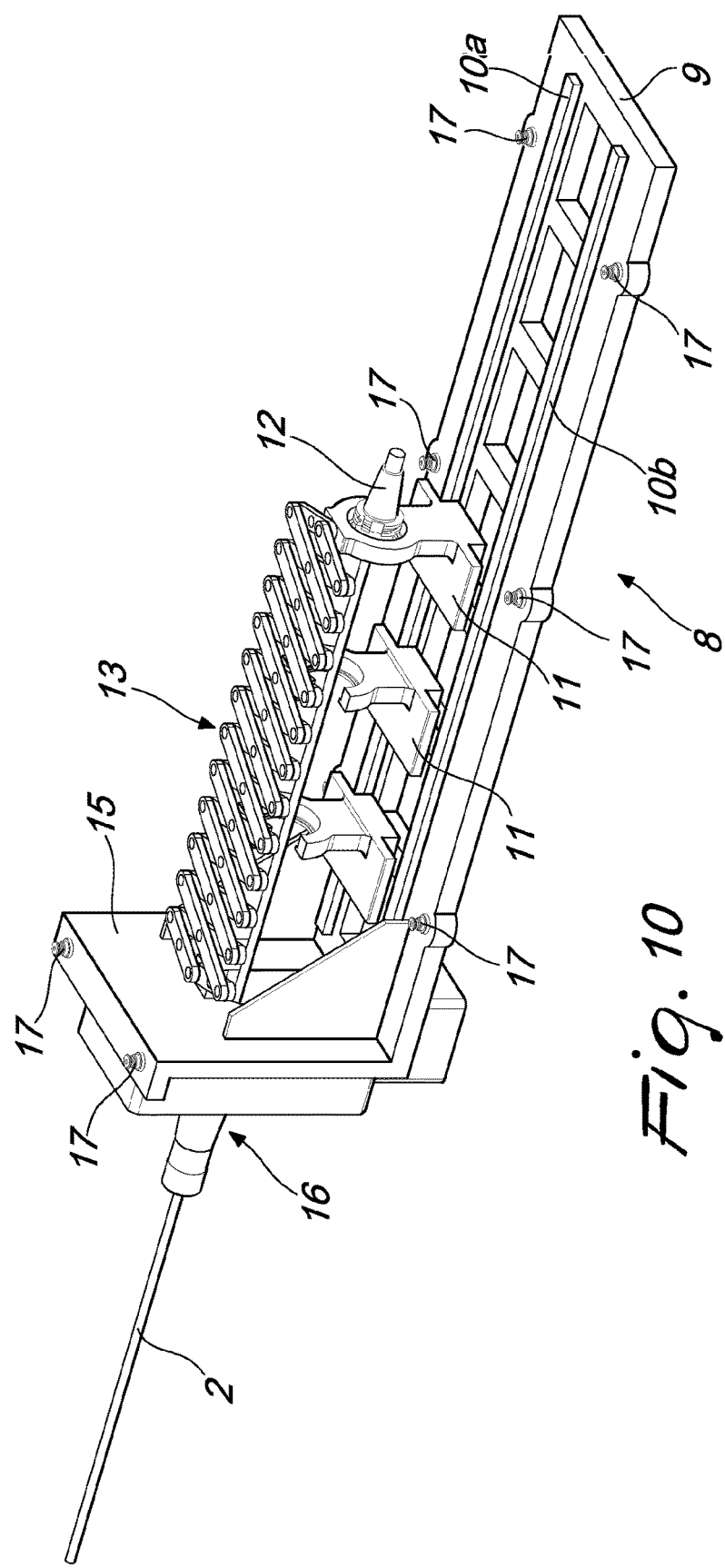
Figure 11:
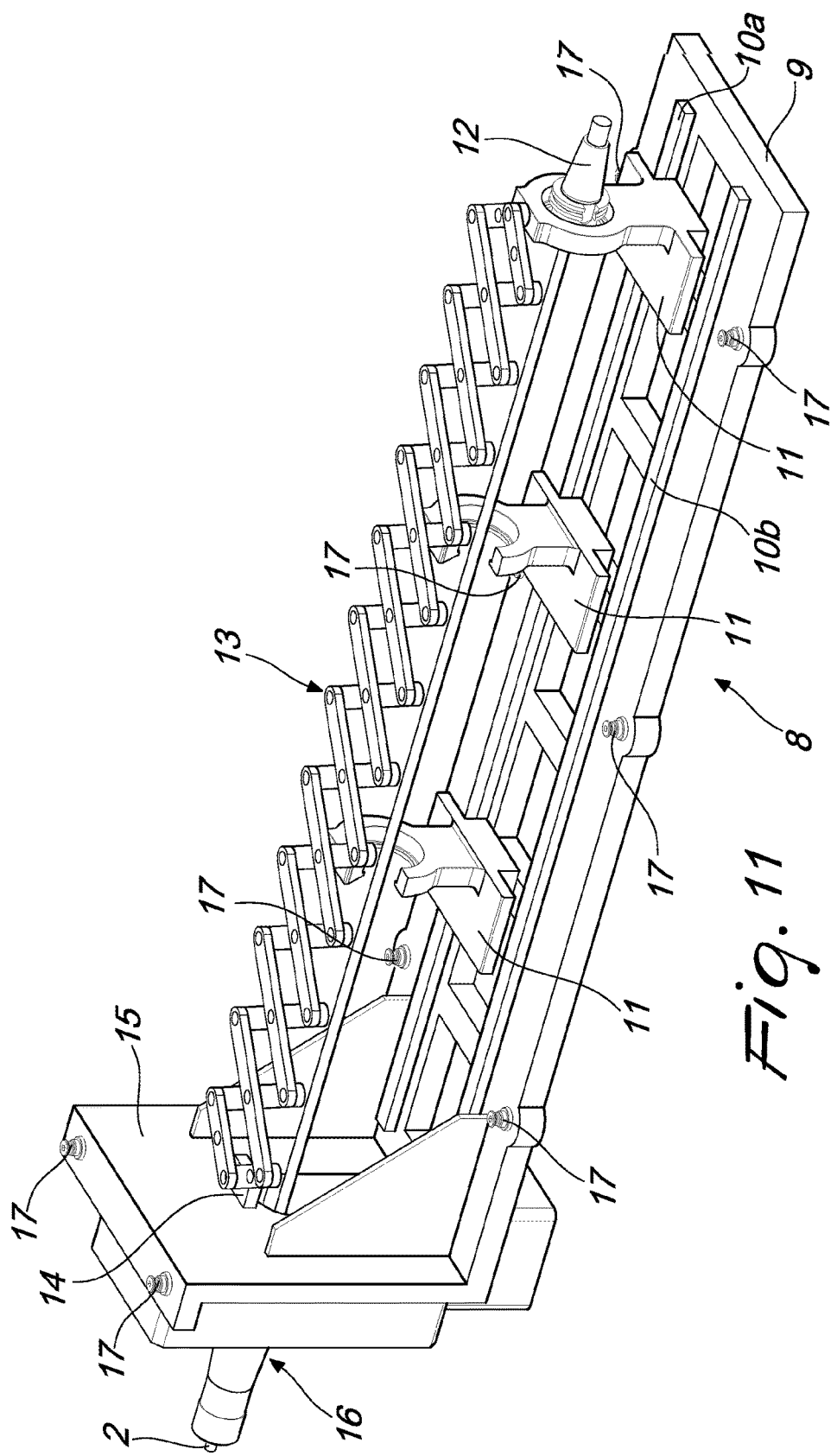

As illustrated in FIG. 7, the slider 8 is then driven in the direction of the head 18 which will then couple with it and transport it to the active milling machine 3 in order to carry out a desired deep hole drilling operation.

In practice it has been found that the invention has fully achieved the intended aim and objects, a device having been obtained that makes it possible to install a drill bit in a machine head for deep hole drilling in a machining center, automatically and without the attendance of an operator.

The device thus makes it possible to carry out a change of drill bits, automatically and without an operator, thus enabling a 24-hour use of the machine even under conditions in which it is not attended by an operator.

The device, moreover, makes it possible to drastically reduce the machine shutdown times for changing the drill bit in the machine, it being possible to prepare the drill bits in advance for the subsequent working operations, thanks to the storage of the sliders in a magazine.

Obviously the materials used as well as the dimensions constituting the individual components of the invention can be more relevant according to specific requirements.

The various means for effecting certain different functions shall not in any way coexist only in the illustrated embodiment, but may be present per se in many embodiments, even if not illustrated.

The characteristics indicated as advantageous, convenient or similar may also be missing or be substituted by equivalent characteristics.

The disclosures in Italian Patent Application No. TV2012A000043 from which this application claims priority are incorporated herein by reference.

Where technical features mentioned in any claim are followed by reference signs, those reference signs have been included for the sole purpose of increasing the intelligibility of the claims and accordingly, such reference signs do not have any limiting effect on the interpretation of each element identified by way of example by such reference signs.

The invention claimed is:

1. A device for changing straight flute drill bits for deep hole drilling between a magazine and an adjacent multifunctional machining machine, the device comprising:
   the magazine, supporting and moving a plurality of single-drill-bit-supporting sliders, which magazine is provided with a movable arm for loading and unloading one of said sliders from said magazine and for positioning one of said sliders at a head of the adjacent multifunctional machining machine, said head having coupling/release means for coupling and releasing said head to and from one of said sliders;
   wherein each one of said sliders includes a respective body provided with a pair of tracks for guiding a plurality of guides,
   wherein one of the plurality of guides of each of the sliders is provided at an end of the respective slider,
   wherein for each said slider, said end one of the guides has a drill-bit-supporting cone and is coupled to an end of a scissor-like device which is associated, at an opposite end of the scissor-like device, with a head plate having an assembly for supporting the respective drill bit of the respective drill-bit-supporting slider.

2. The device according to claim 1, wherein said magazine is provided with a plurality of pairs of protrusions, which protrude, in a same plane, from posts, each pair of protrusions being adapted to support a single one of the drill bit supporting sliders, each head plate of each one of said sliders including a respective protrusion which protrudes from the respective head plate, the respective scissor-like device being associated with the respective head plate protrusion, and each respective assembly for supporting said respective drill bit being located on an opposite side of the respective head plate from the respective head plate protrusion.

3. The device according to claim 2, wherein said magazine comprises, proximate to a region of the magazine that is provided with said plurality of pairs of protrusions, a support for the arm, which support can move along a plane which is parallel to a plane of arrangement in which said single-drill-bit-supporting sliders contained in said magazine are arranged.

4. The device according to claim 3, wherein said arm supports, at an upper region thereof, a tray with which it is possible to associate temporarily the body of a single one of the sliders, said tray having engagement means.

5. The device according to claim 4, wherein said support moves longitudinally, in a longitudinal direction of the magazine, and vertically, so as to arrange selectively said arm and therefore said tray in a plane which is adjacent to said plane of arrangement.

6. The device according to claim 1, wherein at each said body and at each said assembly, there are engagement/disengagement means for engaging and disengaging the respective one of said sliders to and from said head, said head being tiltable about a rotation axis in a controlled fashion and being locked by a positioning brake, said head having a pair of first mutually parallel wings, between which wings a bracket, adapted to support a single one of the sliders, is pivoted.

7. The device according to claim 6, wherein said bracket has an inverted U-shape so as to define a pair of second wings which are sized to accommodate temporarily between them a single one of the sliders, wherein outside said pair of second wings, said coupling/release means are provided in the form of locking spindles, which locking spindles interact with said engagement/disengagement means, said bracket further comprising a motor which is adapted to move, by way of a screw, a carriage which can slide on said pair of tracks, which carriage supports a motorized spindle which interacts with one of said drill bit supporting cones in order to turn said respective drill bit.

8. The device according to claim 1, wherein said magazine has, adjacent to said arm and on an opposite side of the arm with respect to a region of arrangement of a plurality of said single-drill-bit-supporting sliders, a shelf on which a single drill-bit-supporting slider can be arranged temporarily.

* * * * *